(12) United States Patent
Kim

(10) Patent No.: US 6,263,669 B1
(45) Date of Patent: Jul. 24, 2001

(54) EXHAUST MANIFOLD OF GASOLINE ENGINE

(75) Inventor: Han-Sang Kim, Yongin (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/474,730

(22) Filed: Dec. 29, 1999

(30) Foreign Application Priority Data

Feb. 9, 1999 (KR) .................................................. 99-4354

(51) Int. Cl.[7] ...................................................... F01N 7/10
(52) U.S. Cl. ............................... 60/323; 60/321; 60/324
(58) Field of Search ............................... 60/321, 323, 324

(56) References Cited

U.S. PATENT DOCUMENTS

| | | | |
|---|---|---|---|
| 5,440,723 | * | 8/1995 | Arnold et al. ............................. 714/2 |
| 5,572,868 | * | 11/1996 | Okamoto et al. ....................... 60/323 |
| 5,578,832 | * | 8/1995 | Trulson et al. ...................... 250/458.1 |
| 5,606,857 | * | 3/1997 | Harada ................................... 60/323 |
| 5,727,386 | * | 3/1998 | Watanabe et al. ....................... 60/323 |
| 5,765,373 | * | 6/1998 | Bittle et al. ............................ 60/323 |
| 5,816,045 | * | 10/1998 | Blocker et al. .......................... 60/323 |
| 5,845,049 | * | 12/1998 | Wu ........................................ 706/20 |
| 5,864,630 | * | 1/1999 | Cosatto et al. ........................ 382/103 |
| 5,867,985 | * | 2/1999 | Furuhashi et al. ...................... 60/323 |
| 5,881,554 | * | 3/1999 | Novak et al. ........................... 60/323 |
| 5,887,428 | * | 3/1999 | Garisto ................................... 60/323 |
| 5,911,683 | * | 6/1999 | Cui et al. ............................... 60/323 |
| 5,927,070 | * | 7/1999 | Northam et al. ....................... 60/323 |
| 6,018,946 | * | 2/2000 | Matsumoto ............................. 60/323 |
| 6,021,220 | * | 2/2000 | Anderholm ........................... 382/194 |

OTHER PUBLICATIONS

Lank, E.; Blostein, D., N-grams: a well-structured knowledge representation for recognition of graphical documents, Document Analysis and Recognition, 1997., Proceedings of the Fourth International Conference on, vol. 2, 1997, pp. 801–804 vol.2. Jan. 1997.*

\* cited by examiner

*Primary Examiner*—Thomas Denion
*Assistant Examiner*—Diem Tran
(74) *Attorney, Agent, or Firm*—Christie, Parker & Hale, LLP

(57) ABSTRACT

An exhaust manifold of an internal combustion gasoline engine includes first, second, third and fourth runners and mixing pipe, one end of each runner being connected to a cylinder head and another end of each runner being connected to the mixing pipe wherein the runners are connected to the mixing pipe in a longitudinal direction such that exhaust gases are introduced into the mixing pipe without colliding into an inner wall of the mixing pipe.

3 Claims, 5 Drawing Sheets

EXHAUST MANIFOLD OF GASOLINE ENGINE

BACKGROUND OF THE INVENTION (a) Field of the Invention

The present invention relates to an exhaust manifold of an internal combustion engine, and, more particularly, to an improved exhaust manifold capable of reducing exhaust emissions by pre-activating catalysts with a high exhaust temperature, the temperature being maintained by transforming profiles of runners and a connecting angle between the runners and a mixing pipe of the exhaust manifold to minimize heat loss caused by friction of the exhaust gas on a wall of the mixing pipe.

(b) Description of the Related Art

Generally, internal combustion engines generate power to drive vehicles by combusting fuels. Exhaust gases resulting as by-product of this operation are emitted from the engine. Since a relatively excessive amount of exhaust gases is generated during engine warm-up period, the time required for the catalytic converter to activate determines how much exhaust gas is generated during this initial period after the vehicle start-up. The exhaust manifold acts to lead the exhaust gases to the exhaust pipe in which the catalytic converter is installed.

FIG. 1~FIG. 3 show a conventional exhaust manifold. As shown in the drawings, first, second, third, and fourth runners 2, 3, 4, and 5 are connected to an engine cylinder 1 at their one ends, and at their other ends are connected to a mixing pipe 6 to gather the exhaust gases. The runners 2, 3, 4, and 5 have an oval cross-sectional shape.

The exhaust gases generated in engine cylinders are gathered in the mixing pipe 6 through the runners 2, 3, 4, and 5, then directed to a catalytic converter installed in an exhaust pipe (not shown), after which the exhaust gases are discharged from the engine cylinder. The catalytic converter reduces the pollutants in the exhaust gases by typically passing the exhaust gases through a mass of small beads which act as catalysts in converting the pollutants to less harmful gases.

Generally, the catalysts in the catalytic converter chemically react well with exhaust emissions at a light-off temperature (LOT) of about 350° C. At this temperature level, the conversion rate of the catalysts reaches 98%~99%. However, the conversion rate decrease rapidly below the light-off temperature.

For the conventional exhaust manifold, since the first and fourth runners 2 and 5 are connected to the mixing pipe 6 at an angle of approximately 130°~135° (A), the exhaust gases lose heat while passing through this area by the friction of gases resulting from contacting the wall of the mixing pipe 6 during vehicle start-up period. Accordingly, the amount of time it takes for the catalysts to reach the light-off temperature is delayed.

Furthermore, since the first and fourth runners 2 and 5 direct towards the opposite sides of the mixing pipe 6, the exhaust gases from the first and fourth runners 2 and 5 collide into each other then rebound to collide into the inner wall of the mixing pipe 6. This further causes heat loss and acts to delay the time for the catalysts to reach the light-off temperature. This delay in catalyst activation increases toxic exhaust emissions during the period in which the vehicle is warming up.

In addition, after the exhaust gases collide against the wall of the mixing pipe 6, the exhaust gases follow along the wall and are directed to the catalytic converter. As a result, the exhaust gases do not pass evenly through the catalytic converter, but instead are directed only through a portion of the catalytic converter such that the entire active area of the catalytic converter is not utilized. This greatly reduces the conversion efficiency of the catalytic converter.

SUMMARY OF THE INVENTION

The present invention has been made in an effort to solve the above problems of the prior art.

It is an object of the present invention to provide an exhaust manifold of an internal combustion engine capable of reducing toxic exhaust gases during engine warm-up period by increasing a conversion efficiency of a catalytic convert by enabling catalysts in the catalytic converter to quickly reach an light-off temperature.

To achieve the above object, the exhaust manifold of an internal combustion gasoline engine comprising first, second, third and fourth runners and mixing pipe, one end of each runner being connected to a cylinder head and another end of each runner being connected to the mixing pipe wherein the runners are connected to the mixing pipe in a longitudinal direction such that exhaust gases are introduced into the mixing pipe without colliding into an inner wall of the mixing pipe.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
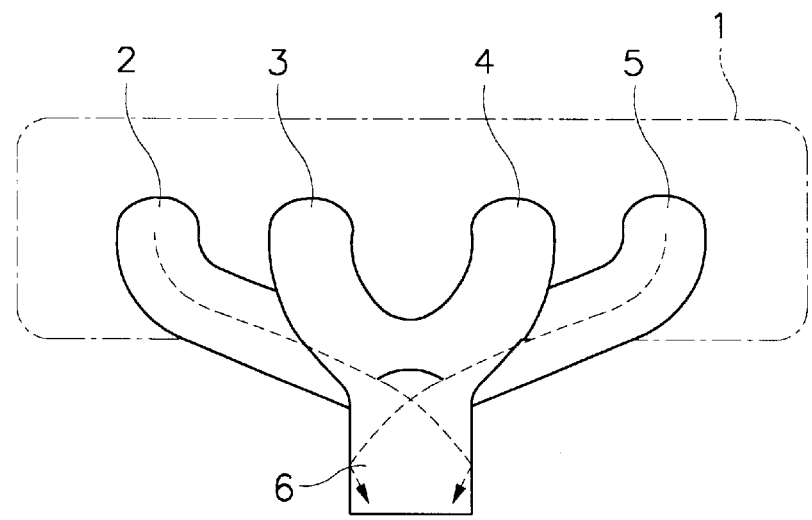
FIG. 1 is a front view of an prior art exhaust manifold.
Figure 2:
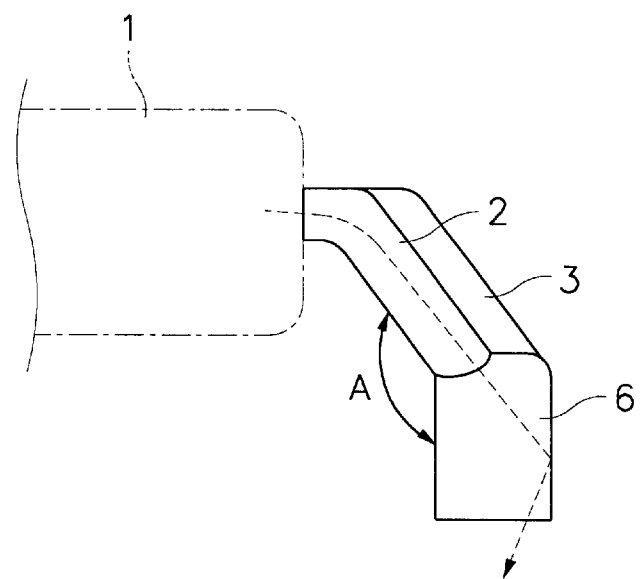
FIG. 2 is a side view of the exhaust manifold shown in FIG. 1.
Figure 3:
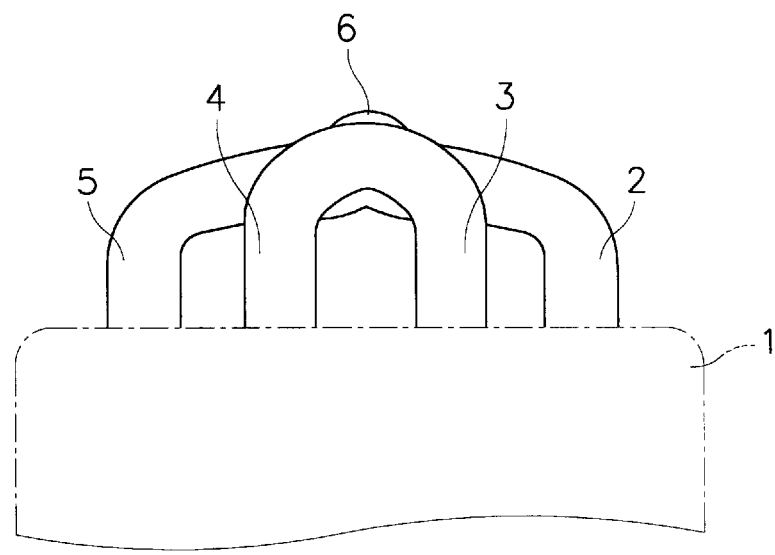
FIG. 3 is a top plane view of the exhaust manifold shown in FIG. 1.

A preferred embodiment of the present invention will be described hereinafter with reference to FIG. 4~FIG. 9.

As shown in the drawings, first, second, third, and fourth runners 11, 12, 13, and 14 exit a cylinder head 1 and are connected to a mixing pipe 6 in substantially a longitudinal direction such that exhaust gases are introduced into the mixing pipe 6 without colliding into a wall of the mixing pipe 6.

In particular, the first and fourth runners 11 and 14 are formed such that an upper end of each runner 11 and 14 is connected to the cylinder head 1 and lower end is connected to an upper end of the mixing pipe 6 in substantially a longitudinal direction. With such a configuration, since an angle between the first and fourth runners 11 and 14 gets narrower as the first and fourth runners 11 and 14 approach the mixing pipe 6, the exhaust gases from the first and fourth runners 11 and 14 are introduced into the mixing pipe 6 in almost a parallel fashion without significantly colliding into each other and the wall of the mixing pipe 6. Accordingly, the heat loss during cold start caused by the generation of friction resulting from such collisions can be minimized.

The second and third runners 12 and 13 are formed such that an upper end of each runner 12 and 13 is connected to the cylinder head 1 between the first and fourth runners, and lower end is connected to the upper end of the mixing pipe 6 also in substantially a longitudinal direction. The second and third runners 12 and 13 are bent downward at their upper portion at almost a right angle so as to connect to the mixing pipe 6 longitudinally. As a result, the exhaust gases from the second and third runners 12 and 13 can pass through the mixing pipe 6 without colliding into the wall of the mixing pipe 6 such that heat loss during the cold start causing by such colliding is minimized.

The first and second runners 11 and 12 are joined to each other to form a connecting portion "B" at their lower ends prior to connection with the mixing pipe. The third and fourth runners 13 and 14 are also joined to each other to form a connection portion "B" at their lower ends prior to connection with the mixing pipe. Formed integrally with the connecting portion where the first runner joins the second runner and where the third runner joins the first runner are crescent shaped flow guiders 20. The guiders 20 are formed downward such that the exhaust gases from the runners 11, 12, 13, and 14 are directed to a catalytic converter without colliding into each other.

Figure 7:
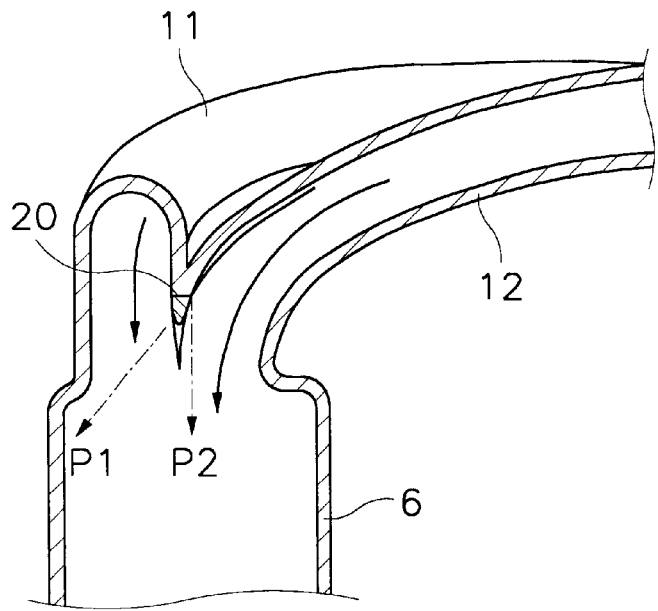
FIG. 7 is a partial sectional view taken along line A—A of FIG. 6.
Figure 8:
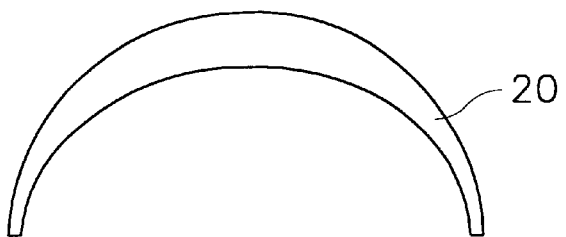
FIG. 8 is front view of a guider provided in the exhaust manifold shown in FIG. 4.

As shown in FIG. 7, the exhaust gas from the first runner 11 is supplied in a direction "P2" regardless of whether the guider 20 is provided or not. However, the exhaust gas from the second runner 12 is supplied in the direction "P2" as a result of being guided along the guider 20 provided at the connecting portion "B" between the first and second runners 11 and 12. If the guider 20 is not provided, the exhaust gas from the second pipe 12 is supplied in a the direction "P1". This would collide to the wall of the mixing pipe 6, resulting in heat loss.

Since the runners 11, 12, 13, and 14 are connected to the mixing pipe 6 longitudinally, the gases from the first, second, third, and fourth runners 11, 12, 13, and 14 are mixed without colliding into the wall of the mixing pipe 6 and then uniformly passed through the mixing pipe 6 and the catalytic converter.

Since the gases pass uniformly through the catalytic converter without heat loss, the catalysts in the catalytic converter quickly reach their light-off temperature such that the chemical reactions occurring in the catalytic converter are optimized, resulting in better minimizing exhaust emissions.

Figure 9A:
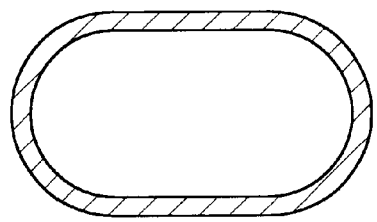
FIG. 9a and FIG. 9b are cross-sectional views of runners shown in FIG. 4.
Figure 9B:
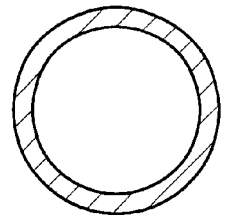

With regard to a shape of the runners 11, 12, 13, and 14, the upper ends of each runner 11, 12, 13, and 14 are oval-shaped as shown in FIG. 9a while the lower ends are circle-shaped as shown in FIG. 9b, the transformation from the oval shape to the circle shape occurs gradually in the runners 11, 12, 13, and 14. The change into the circle shape further reduces heat loss during cold start condition caused by friction by limiting the collision of the exhaust gases against walls of the runners 11, 12, 13, and 14. It has been shown through experimentation that a circle-shaped runner loses approximately 9% less heat than an oval-shaped runner.

Figure 4:
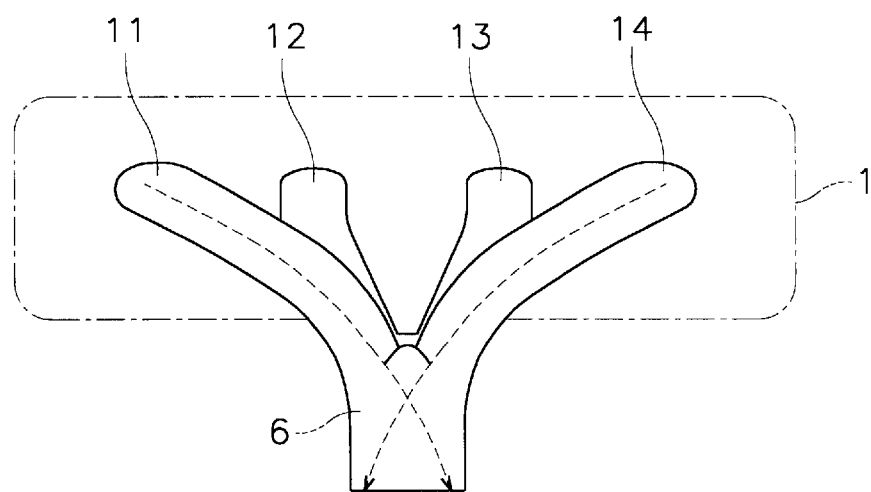
FIG. 4 is a front view of an exhaust manifold according to a preferred embodiment of the present invention.
Figure 5:
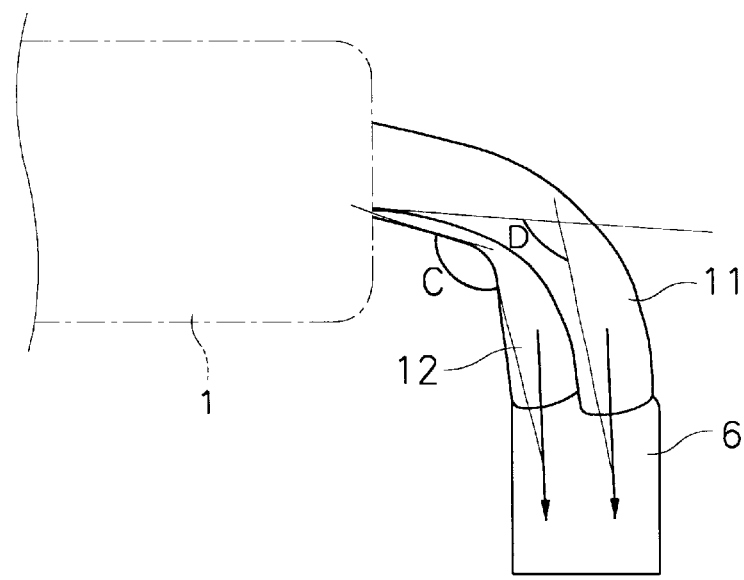
FIG. 5 is a side view of the exhaust manifold shown in FIG. 4.
Figure 6:
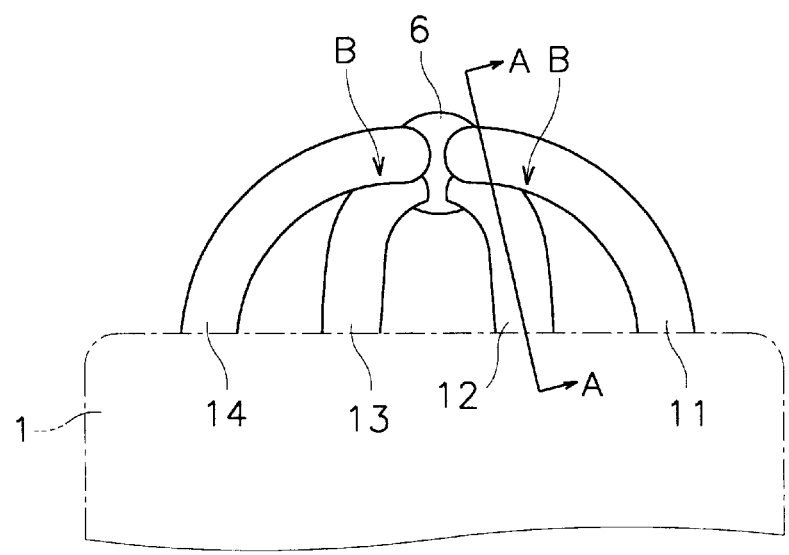
FIG. 6 is a top plane view of the exhaust manifold shown in FIG. 4.

As shown in FIG. 4 and FIG. 6, the first and second runners 11 and 12 and the third and fourth runners 13 and 14 are symmetrically connected to the mixing pipe 6. This formation enhances the mixing of the exhaust gases, in addition to enabling the easy mounting of an $O_2$ sensor (not shown) so that an air-fuel ratio can be precisely controlled.

As described above, in the exhaust manifold according to the present invention, the runners are connected to the mixing pipe longitudinally such that the exhaust gases from the runners are mixed without colliding to the wall of the mixing pipe and are uniformly passed through the mixing pipe, resulting in minimizing heat loss of the exhaust gases during the cold start. Accordingly, the catalytic converter quickly reaches its light-off temperature such that toxic emissions are reduced by the heightened reactivity of the catalysts in the catalytic converter.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An exhaust manifold for an internal combustion engine comprising:

first, second, third, and fourth runners, each runner having upper and lower ends, wherein the runners are secured at their upper ends to a cylinder head;

a mixing pipe surrounding the lower ends of the runners;

the lower ends of the runners being connected to the mixing pipe in a substantially longitudinal direction such that exhaust gases are introduced into the mixing pipe without colliding with the inner walls of the mixing pipe;

the first and second runners being joined to each other over a connecting portion at their lower ends prior to connection with the mixing pipe;

the third and fourth runners being joined to each other over a connecting portion at their lower ends prior to connection with the mixing pipe;

at least one crescent shaped exhaust flow guider formed integrally with the connecting portion where the first runner joins the second runner and where the third runner joins the first runner; and the runners having an oval cross section at their upper ends and transitioning to a circular cross section at their lower ends.

2. The exhaust manifold of claim 1, where in the first and second runners and the third and fourth runners are symmetrically connected to the mixing pipe.

3. The exhaust manifold of claim 1, wherein each runner is bent at an angle of about 95 degrees to about 120 degrees.

* * * * *